Oct. 11, 1966    A. WAGNER ETAL    3,277,804
DEVICE FOR RELIEVING THE PRESSURE FROM
THE HAND OF A METERING DEVICE
Filed March 6, 1964    2 Sheets-Sheet 1

INVENTORS
ADAM WAGNER
BY HANS-GEORG FLACH

Toulmin & Toulmin
Attorneys

Oct. 11, 1966    A. WAGNER ETAL    3,277,804
DEVICE FOR RELIEVING THE PRESSURE FROM
THE HAND OF A METERING DEVICE
Filed March 6, 1964    2 Sheets-Sheet 2

INVENTORS
ADAM WAGNER
BY HANS-GEORG FLACH

Toulmin & Toulmin
Attorneys

United States Patent Office 3,277,804
Patented Oct. 11, 1966

3,277,804
DEVICE FOR RELIEVING THE PRESSURE FROM THE HAND OF A METERING DEVICE
Adam Wagner, Garbenheim, Kreis Wetzlar, and Hans G. Flach, Wetzlar, Germany, assignors to Ernst Leitz G.m.b.H., Wetzlar, Germany
Filed Mar. 6, 1964, Ser. No. 349,918
Claims priority, application Germany, Mar. 12, 1963, L 44,336
10 Claims. (Cl. 95—10)

This invention relates to cameras and particularly to cameras having exposure meters incorporated therein which exposure meters are operable for effecting the automatic setting of one or both of the shutter speed and aperture opening of the pertaining camera.

Cameras of the type having photoelectrically operated exposure meters are known and such cameras, in general, operate by putting the camera in a position to take a picture whereupon the exposure meter is actuated by the light conditions in the region to be photographed, and the hand or pointer of the exposure meter will move to a predetermined position of deflection. The hand or pointer is then clamped into position and prior to operation of the shutter of the camera, the now clamped hand or pointer is availed of to stop a movable element, the movement of which adjusts the shutter speed or aperture opening or both, the amount of movement of the movable member, as determined by the pointer of the exposure meter, effecting the desired setting of the variable factors in accordance with the light falling on the exposure meter. One difficulty that has been encountered with cameras of this nature is that undue load is many times placed upon the point of the exposure meter by the member which it stops because some fairly substantial amount of power is required to accomplish the setting of the variable devices connected with the movable member.

The present invention is particularly concerned with an arrangement for preventing the pointer or hand of the exposure meter from being loaded beyond a permissible amount so that the pointer is not bent and so that the bearings of the exposure meter movement, which are of necessity fragile, are not in any way damaged.

A primary object of the present invention therefore is the provision of an arrangement for limiting the load on a movable meter pointer when this meter pointer is utilized as a stop for an adjustable member whether the meter is incorporated directly in a camera or whether it is separate from a camera or utilized for some other purpose.

Another object of this invention is the provision of an arrangement for limiting the load imposed upon a movable meter pointer which is to serve as a stop for a movable member without in any way detracting from the precision with which the member moves into and occupies the stopped position thereof.

Still a further object of this invention is the provision of an arrangement referred to directly in a camera structure so that the operation of a camera is substantially conventional while the limiting of the load imposed on the exposure meter pointer by the movable member which it stops is automatically accomplished and without any loss of time or loss of accuracy of the positioning of the member.

Still another object of the present invention is the provision of an arrangement of the nature referred to in a camera structure which involves no modification of the structure of the exposure meter or the basic camera structure beyond certain structural changes directly associated with the movable member itself.

These and other objects and advantages of this invention will become more apparent upon reference to the following specification taken in connection with the accompanying drawings in which.

*General arrangement*

Figure 1:
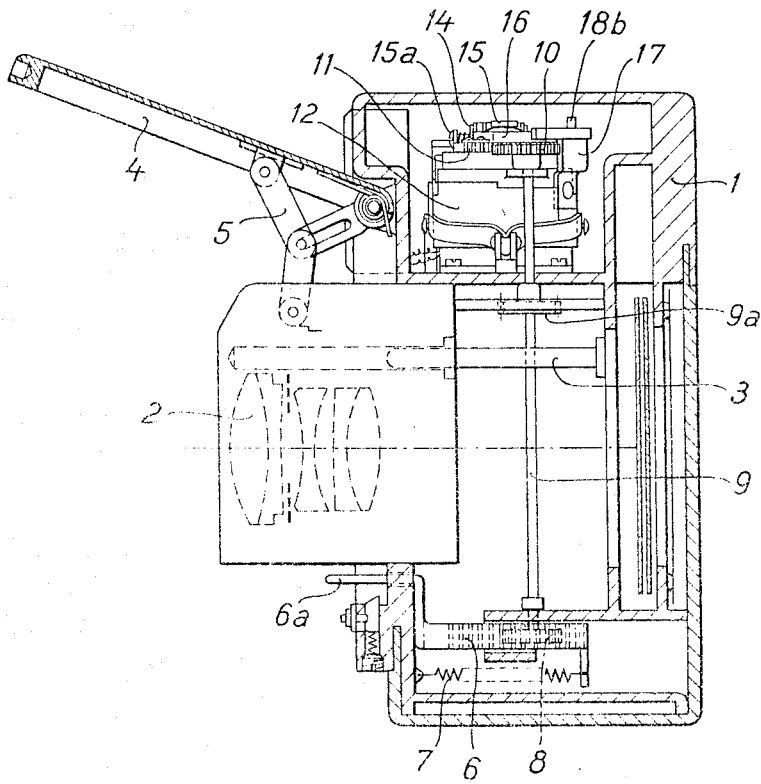
FIGURE 1 shows, somewhat diagrammatically, a vertical section through a camera with a snap-open lid or cover having an exposure meter incorporated therewith and constructed in accordance with the present invention.

The present invention is adapted for incorporation in a camera of a known type in which the camera has a snap-open lid or cover on the front. When the lid or cover snaps open the objective lens moves to operative position and the shutter is actuated to take a photograph. Devices connected with the movable cover are employed for adjusting the shutter speed or aperture opening, preferably during the initial portion of the opening movement of the lid or cover so that by the time the cover is completely open and the shutter is actuated, the camera is adjusted for taking the photograph under proper conditions.

The camera includes an exposure meter and has a movement with a swinging pointer, and when the lid or cover is closed, the pointer is free to swing so that by pointing the camera at the scene to be photographed, the pointer of the exposure meter will assume a position corresponding to the conditions of illumination of the scene to be photographed. Upon releasing the lid or cover to snap to its open position, the pointer of the exposure meter is first clamped in its respective position while simultaneously a movable member is released by the opening movement of the lid and is moved under the influence of a spring toward the now clamped pointer so as to be stopped thereby. This movable member effects the adjustment of one or both of the shutter speed and aperture opening in accordance with its stopped position. Upon the lid or cover reaching its completely open position and the objective lens means therefore being positioned properly, the shutter is now actuated, either manually or automatically, and the camera is completely adjusted for taking the photograph.

The present invention pertains to an arrangement for preventing the movable member from placing too great a load on the pointer of the exposure meter and accomplishes this by incorporating an impositive driving element between the said movable member and the actuating spring for the movable member while furthermore taking up the load of the actuating spring immediately after the member is brought to a halt by engagement with the said pointer and without any substantial amount of over drive beyond the stopped position of the member.

According to one modification of the present invention, a leaf spring effects the driving connection to the movable member, and upon stopping of the movable member, the leaf spring flexes and engages a stationary notched member in the camera thereby bringing the leaf spring and the camera adjusting mechanism connected thereto to a halt while limiting the load imposed on the exposure meter pointer.

According to another modification the leaf spring in flexing while the movable member halts, engages a resilient rubber-like member and is brought to a halt thereby, and in the same manner and with the same result as referred to above.

The use of the rubber-like member in place of the toothed member provides for halting of the leaf spring and the mechanism connected thereto in any desired position so that the manufacturing tolerances when the rubber-like member is employed need not be maintained as accurately as in the case of the notched stop member.

*Detailed description*

Referring more particularly to the drawings, the camera shown therein comprises a housing 1 in which is reciprocably mounted objective lens means 2 as by means of a sliding barrel slidable on guide rod means or the like 3. A snap-open lid is pivotally mounted on the front of the camera and is connected by the toggle mechanism 5 with the barrel of the objective lens means so that when the lid is closed the objective lens means will be retracted into the camera and will be covered by the lid.

Reciprocably mounted in housing 1 is a toothed rack 6 having an actuating rod element 6a thereon extending through the front of the camera for engagement by lid 4 when the latter is closed. A spring 7 biases the rack and its actuating element forwardly in the camera so that the first portion of the opening movement of the lid or cover 4 will be accompanied by forward movement of rack 6 in the camera housing.

Rack 6 engages a pinion 8 mounted on shaft 9 rotatable in the camera housing and extending vertically upwardly therein to the region of the top where the exposure meter mechanism of the camera is located. This exposure meter mechanism may comprise the portion 9b upon which the light falls and which is connected by wires 9c to a movement which is illustrated in FIGURES 2 and 3.

Mounted on shaft 9 is a gear 9a connected in a known manner with the mechanism for adjusting the variable factor or factors of the camera, namely, the aperture opening or the shutter speed. Such adjustments are known and are not disclosed in detail in this application. It will be appreciated however that the amount of rotation imparted to shaft 9 will effect adjustment of the pertaining variable factor or factors in accordance with the degree of rotation of the shaft 9.

Figure 2:
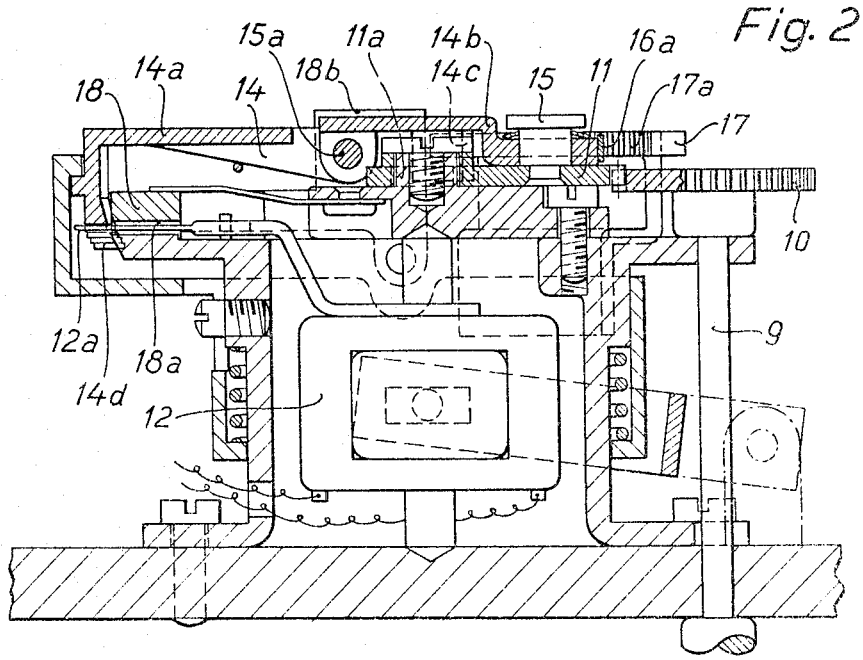
FIGURE 2 is a fragmentary view of the camera drawn at enlarged scale showing in section the movement of the exposure meter and the mechanism adjacent thereto.
Figure 3:
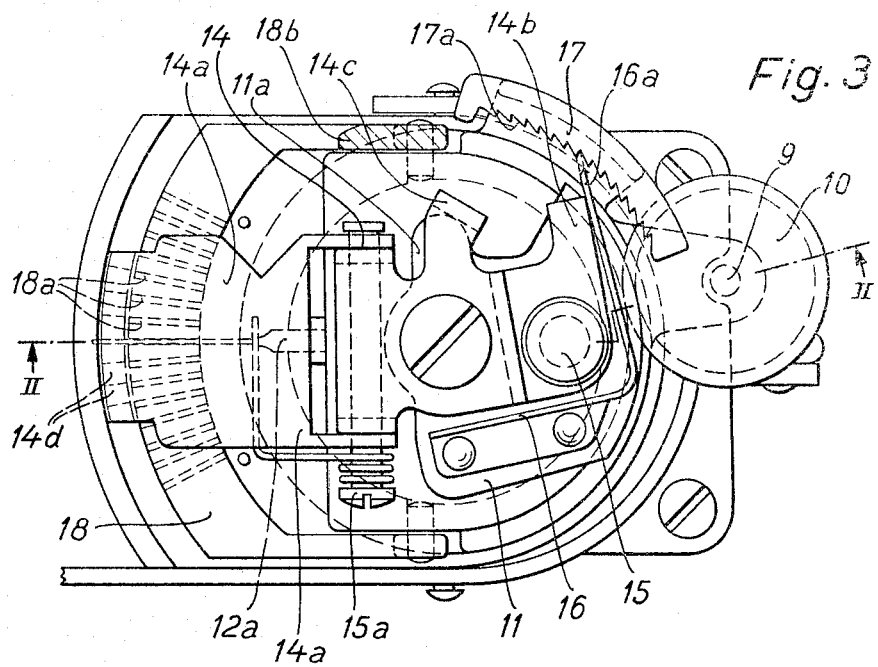
FIGURE 3 is a plan view of FIGURE 2 showing more in detail the mechanism associated with the movable member which is stopped by the pointer of the movement.

Shaft 9 also carries a gear 10 at its upper end, and as will be seen in FIGURES 2 and 3, gear 10 meshes with a gear sector 11 pivoted on a stationary pivot post 11a. Gear sector 11 forms the support element for a scanning member which sweeps over the path of pointer 12a of the movement 12 of the exposure meter. This scanning member is indicated at 14 and includes a part 14a that has a dependent portion provided with steps 14d for engagement with the end of meter pointer 12a. The scanning member comprises another portion 14b to which portion 14a is pivotally connected by the horizontal pivot pin means 15a, and part 14b of scanning member 14 is pivotally connected by pivot post 15 with gear sector 11.

The scanning member 14 is normally held in a predetermined position on the gear sector by the leaf spring 16, best seen in FIGURE 3, having one end fixed to gear sector 11 and having an angularly extending portion extending along the end of member 14b engaging a corner 14e thereof remote from the pivot post 15. At this point it will be apparent that scanning member 14 is biased toward a predetermined position on gear sector 11, but that the scanning member 14 can be stopped by pointer 12a while gear sector 11 can continue to move after the end of member 14 engaged by the pointer 12a has come to a halt.

Such movement of gear section 11 however will be accompanied by outward flexing of the extreme end 16a of leaf spring 16 so that this end will engage a tooth of the notched arcuate member 17 stationarily mounted in the camera housing. The actual stopping of gear sector 11 and the camera adjusting mechanism connected therewith including gear 10, shaft 9 and gear 9a, will thus be accomplished by the toothed element 17 so that the major portion of the load imposed upon the adjusting mechanism by the spring 7 will be carried by toothed member 17 and not by pointer 12a of the instrument movement. In this manner the pointer of the instrument movement is substantially unloaded and the necessarily fragile and delicate mechanism constituting the movement and pointer will not be damaged.

FIGURE 3 will also show that gear sector 11 includes a projection 11a engageable with dependent portion 14c of part 14b of the scanning member 14 so that the member 14 has a predetermined initial position on gear sector 14 which it always occupies thereon except when the member is stopped by pointer 12a and sector 11 continues to move.

Figure 4:
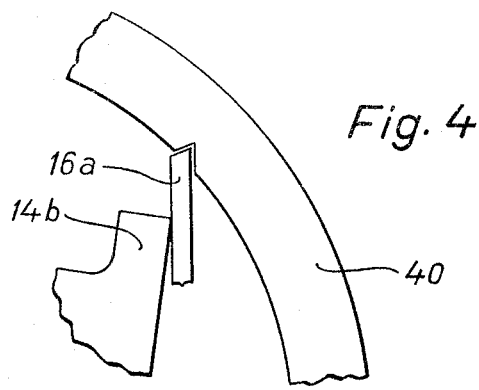
FIGURE 4 is a fragmentary view showing a modification of the invention.

A modification of the stopping arrangement is shown in FIGURE 4 wherein a resilient rubber-like member 40 replaces toothed member 17. The end 16a of the leaf spring 16 will engage member 40 when members 11 and 14 move relatively and this will serve to stop the adjusting mechanism and take the load off pointer 12a in whatever position pointer 12a occupies and without the necessity of the end of the leaf spring finding a tooth as is the case with the FIGURE 3 modification.

Returning now to the meter pointer and the clamping arrangement therefor and the like, when the camera is closed, the pointer 12a is swingable over a platform 12b and is adapted for being clamped thereto by the clamping hoop or sector 18 having notches 18a in the bottom. This clamping sector or hoop is urged toward clamping position by spring means 18c and is lifted from clamping position by cam means 18b thereon engaged by the surface 14f of part 14a when this part is swung to its retracted position which would be in a clockwise direction from its FIGURE 3 position. The clamping member is pivoted on pivot means 18d which will be seen in FIGURE 3 so that it can move up and down.

The part 14a of the scanning member 14 is biased by spring means 15b in the upward direction, and is limited in its upward movement by flange means 14g which engage flange means 14h in a vertically movable adjusting member 41 which is under the control of an adjustable yoke 42. As will be seen, the steps 14d on part 14a of the scanning member can thus be made selectively effective by an initial adjustment of yoke 42. The amount of movement taken by scanning member 14 is thus under the control of the adjustment of yoke 42 and the part 41 connected therewith and the stopped position of pointer 12a.

In operation, with lid 4 closed the cam is pointed toward the object to be photographed. In this position the toothed rack 6 is pushed back, the pointer is unclamped and scanning member 14 is in retracted position.

The lid is now open and the toothed rack 6 is moved forwardly by spring 7 thus turning shaft 9 and gear 10 and thereby driving scanning member 14 toward pointer 12a. As soon as scanning member 14 starts to move clamping member 18 drops and clamps the pointer 12a, and after further movement of scanning member 14, it will come into engagement with the stopped pointer by engagement of the pointer by whichever one of the steps 14d thereof is adjusted into the plane of the pointer. Upon stopping of the scanning member 14 gear sector 11 will continue to move a short distance until the end 16a of leaf spring 16 is thrust into the toothed member 17 or the resilient member 40, whichever is being employed. The spring 16 carries the major portion of the load of spring 6 and thus protects pointer 12a and the movement 12 to which it is connected.

Upon closing of lid 4 the reverse of the aforementioned steps takes place.

It will be apparent that retraction of scanning member 14 is accomplished by a positive connection between the scanning member and gear sector 11 and that the drive by leaf spring 16 in the advancing direction of member 14 is sufficient to insure movement of member 14 to its proper stopped position so that no precision of adjustment of the camera is lost by the practice of the present invention.

The material of the stop member, when it is resilient, could be rubber or a rubber-like material such as polyvinylchloride.

A complete camera structure of the type adapted to practice the present invention has been disclosed in U.S. application Serial No. 322,095, filed November 7, 1963.

It will be understood that this invention is susceptible to modification in order to adapt it to different usages and conditions; and accordingly, it is desired to comprehend such modifications within this invention as may fall within the scope of the appended claims.

We claim:

1. In combination; an instrument having a swingable pointer, means to clamp the pointer in a deflected position thereof, a scanning member for engagement with said pointer when the latter is clamped, a rotatable support element for the scanning member pivoted thereto on an axis spaced radially from the axis of rotation of the support member, a positive drive connection between the members in the direction of rotation thereof which retracts the scanning member from the pointer, a yieldable element connected to said support member and engaging said scanning member and forming an impositive drive connection between said members in the other direction of rotation thereof, a drive spring operatively connected to said support member to drive it in said other direction of rotation, said yieldable element being adapted to yield upon engagement of said scanning member with said pointer when the drive spring is actuating said support member, said yieldable element having a portion which is displaced out of the normal path taken thereby when said yieldable element yields, and a stationary stop member positioned adjacent the path taken by said portion of said yieldable element and operable when said portion of said element is displaced upon yielding of said element to engage said portion of said yieldable element and take up the thrust of said drive spring and thereby protect said pointer from overloads.

2. In combination; an instrument having a swingable pointer, means to clamp the pointer in a deflected position thereof, a scanning member for engagement with said pointer when the latter is clamped, a rotatable support element for the scanning member pivoted thereto on an axis spaced radially from the axis of rotation of the support member, a positive drive connection between the members in the direction of rotation thereof which retracts the scanning member from the pointer, a yieldable element connected to said support member and engaging said scanning member and forming an impositive drive connection between said members in the other direction of rotation thereof, a drive spring operatively connected to said support member to drive it in said other direction of rotation, said yieldable element being adapted to yield upon engagement of said scanning member with said pointer when the drive spring is actuating said support member, said yieldable element including a portion which is displaced laterally from its normal path upon yielding of said yieldable element, and a stationary stop member positioned adjacent the path taken by said portion of said yieldable element and operable when said portion of said element is displaced upon yielding of said element to engage said portion of said element and halt said support member and also take up the thrust of said drive spring thereby to prevent said pointer from being subjected to overloads.

3. In combination; an instrument having a swingable pointer, means to clamp the pointer in a deflected position thereof, a scanning member for engagement with said pointer when the latter is clamped, a rotatable support element for the scanning member pivoted thereto on an axis spaced radially from the axis of rotation of the support member, a positive drive connection between the members in the direction of rotation thereof which retracts the scanning member from the pointer, a blade-like element connected at one end to said support member and having its other end extending along the side of said scanning member and spring urged toward the scanning member to form an impositive driving connection between said members in said other direction of rotation thereof, a drive spring operatively connected to said support member to drive it in said other direction of rotation, said other end of said blade-like element yielding outwardly upon engagement of said scanning member with said pointer when said drive spring is actuating said support member, and a stop member stationarily mounted adjacent the path taken by said other end of the blade-like element operable for engagement with said other end of the blade-like element upon said outward movement thereof to stop said support member and take up the thrust of said drive spring.

4. The combination according to claim 3 wherein said stop member is arcuate and has teeth on the side toward said other end of the blade-like element.

5. The combination according to claim 3 wherein said pointer has predetermined clamped positions and said stop member has teeth on the side toward said other end of the blade-like element spaced in conformity with said clamped positions of the pointer so that only a small amount of overtravel of the support member is required in each position of engagement of the scanning member with the pointer member to bring the said other end of the blade-like element into engagement with a tooth of the stop member.

6. The combination according to claim 3 wherein said stop member is arcuate and at least that side toward said other end of said blade-like element is resilient rubber-like material.

7. The combination according to claim 3 wherein said blade-like element is a leaf spring having its larger cross-sectional dimension extending parallel to the axis of rotation of said members and having its said other end extending in the direction in which said scanning member moves in approaching said pointer and making an acute angle with said stop member on the trailing side of said leaf spring.

8. The combination according to claim 3 wherein means is provided operable during the final movement of said scanning member away from said pointer and into retracted position for moving said means for clamping said pointer into unclamping position.

9. The combination according to claim 3 wherein said instrument is an exposure meter, a camera in which said meter is embodied, and means connected to said support member for adjusting at least one of the shutter speed and aperture opening of the camera in conformity with the stopped position of said support member and scanning member.

10. The combination according to claim 9 in which said camera includes a lid covering the lens means of the camera and openable to expose the lens means, and a member operatively connected to said support member and engageable by said lid for moving said support member and scanning member to retracted position during the final portion of the closing movement of the lid.

References Cited by the Examiner

UNITED STATES PATENTS 2,949,070    8/1960    Frost _____ 95—10

JOHN M. HORAN, *Primary Examiner.*